Patented May 2, 1933

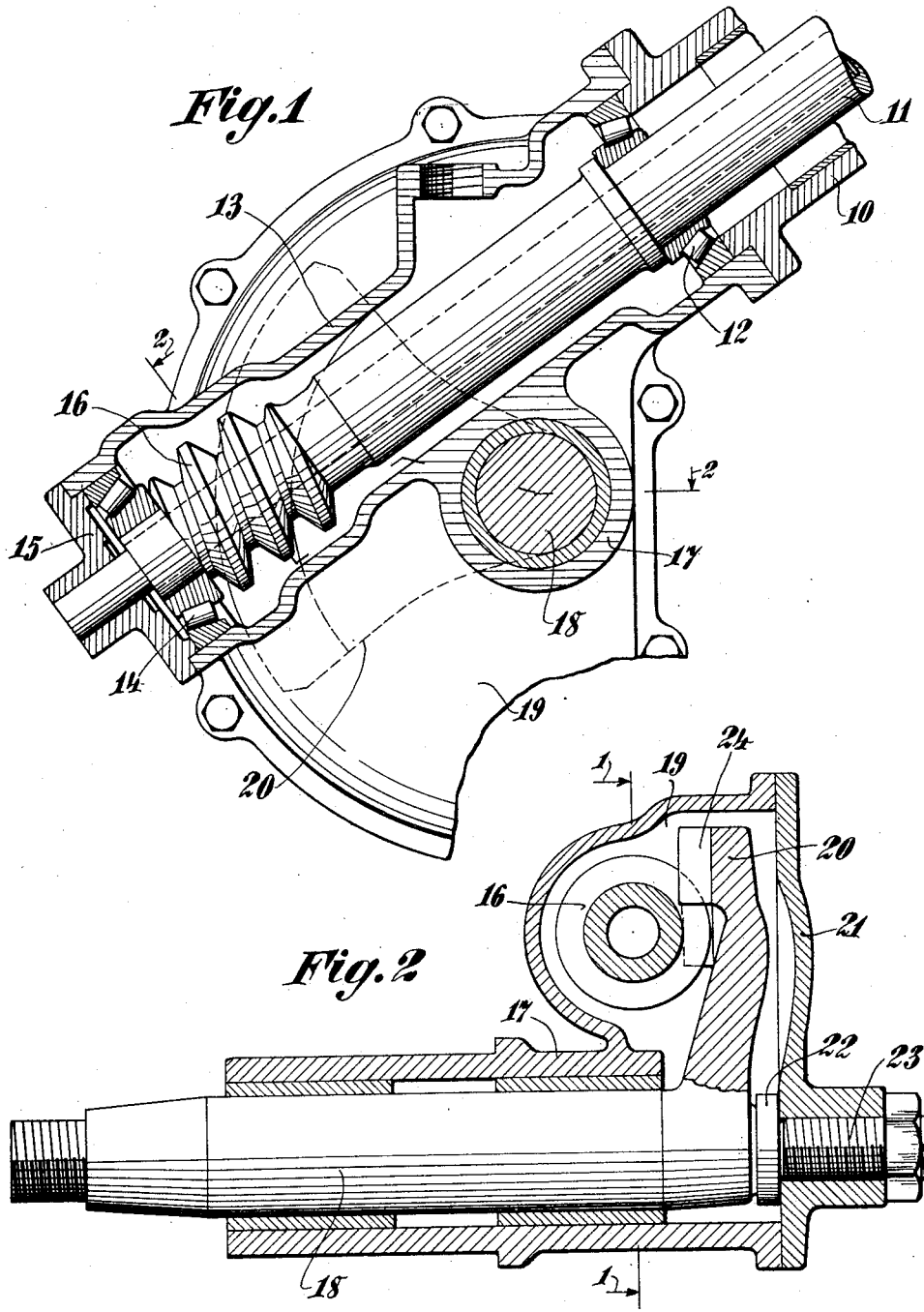

1,906,720

UNITED STATES PATENT OFFICE

AZOR D. ROBBINS, OF NEW BRUNSWICK, NEW JERSEY, ASSIGNOR TO INTERNATIONAL MOTOR COMPANY, OF NEW YORK, N. Y., A CORPORATION OF DELAWARE

STEERING GEAR

Application filed April 18, 1931. Serial No. 531,032.

The present invention relates to steering gears for motor vehicles and embodies, more specifically, an improved worm and sector type of steering mechanism which employs interengaging teeth having profiles conforming to Archimedean spirals.

With the factors of power ratio and non-reversibility which are of vital importance in the design of steering mechanisms, are those of effective lubrication and ease of operation which have been difficult to combine in a single form of mechanism. The use of the so-called "hypoid" gearing for mechanisms of this character has necessitated the location of the pinion above the axis of the sector shaft in order that the proper direction may be imparted to the sector and the desired conditions attained.

In existing mechanisms, the adjustment of the worm and sector has been very difficult (in the most approved form of connection, such as the hypoid) and the problem of effective lubrication has likewise presented difficulties. The present invention has for an object therefore the provision of a steering mechanism which may be readily adjusted and which is susceptible of effective lubrication.

A further object of the invention is to provide a mechanism of the above character, wherein the elements are so disposed as to permit the engaging teeth of the worm and sector to be submerged in oil, further provision being made for the adjustment of the position of the sector with respect to its driving worm.

Further objects, not specifically enumerated above, will be apparent as the invention is described in greater detail in connection with the accompanying drawing, wherein:

Figure 1 is a view in vertical section, taken on the plane indicated by the line 1—1 in Figure 2, and looking in the direction of the arrows.

Figure 2 is a view in section, taken on line 2—2 of Figure 1, and looking in the direction of the arrows.

Referring to the above drawing, a housing for a steering column is shown at 10 and receives a steering column 11 which is journaled therein by means of bearing 12. The steering column extends within a worm housing 13 and its end is journaled at 14 within a cap 15 of the housing 13, a worm 16 being carried on the shaft and having the profile of its teeth conforming to a helicoidal worm.

The worm housing 13 is formed with a sleeve 17 in which a sector shaft 18 is journaled, a sector housing 19 being carried by the worm housing and receiving a sector 20 which is keyed to the sector shaft 18. A closure 21 is adapted to be secured to the sector housing and carries a button 22 coaxially with the sector shaft 18, a set screw 23 being provided to vary the axial position of the button 22 with respect to the sector 20. Teeth 24 which conform to an Archimedean spiral are formed upon the side of the sector facing the sector shaft (that is, upon the side opposite the bearing button 22) and adjustment of the position of the teeth 24 with respect to the worm 16 is attained by suitable adjustment of the screw 23.

The foregoing construction thus facilitates the adjustment of the position of the sector with respect to the worm and, inasmuch as the worm is substantially in the horizontal plane of the axis of the sector shaft or below the same, the apparatus may run in oil, thus greatly facilitating the effective lubrication of the mechanism.

While the invention has been described with specific reference to the accompanying drawing, it is not to be limited, save as defined in the appended claim.

I claim as my invention:

A steering gear comprising a steering column, a sector shaft, means to journal the shaft below the steering column, a sector on the shaft, and a worm on the steering column and engaging the sector at a point below the axis of the sector shaft.

This specification signed this 15th day of April, A. D. 1931.

AZOR D. ROBBINS.